(No Model.)

W. F. BROTHERS.
AUTOMATIC TENSION FOR CABLES.

No. 551,744. Patented Dec. 17, 1895.

Attest:
Jacob Marr
Edw. F. Kinsey.

Inventor.
William F. Brothers, per
Thos. S. Crane, Atty.

UNITED STATES PATENT OFFICE.

WILLIAM F. BROTHERS, OF BROOKLYN, NEW YORK, ASSIGNOR TO SARAH E. BROTHERS, OF SAME PLACE, AND MARIA A. BROWN, OF PLAINFIELD, NEW JERSEY.

AUTOMATIC TENSION FOR CABLES.

SPECIFICATION forming part of Letters Patent No. 551,744, dated December 17, 1895.

Original application filed July 18, 1895, Serial No. 556,327. Divided and this application filed September 6, 1895. Serial No. 561,627. (No model.)

*To all whom it may concern:*

Be it known that I, WILLIAM F. BROTHERS, a citizen of the United States, residing at Brooklyn, Kings county, New York, have invented certain new and useful Improvements in Automatic Tensions for Cables, fully described and represented in the following specification and the accompanying drawings, forming a part of the same.

The present application relates to means for maintaining the angle of a suspended cable with its supports in different positions of a shifting load; and the application is a division of that filed July 18, 1895, Serial No. 556,327, and entitled "Cable crane with gravity anchor."

The invention is illustrated in the annexed drawings, in which—

Figure 1:
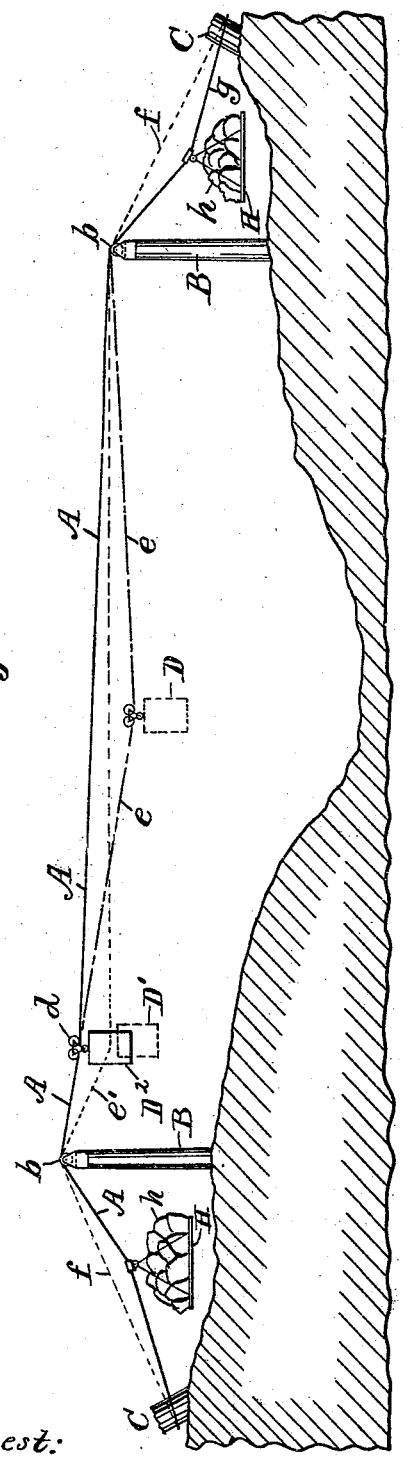
Figure 2:
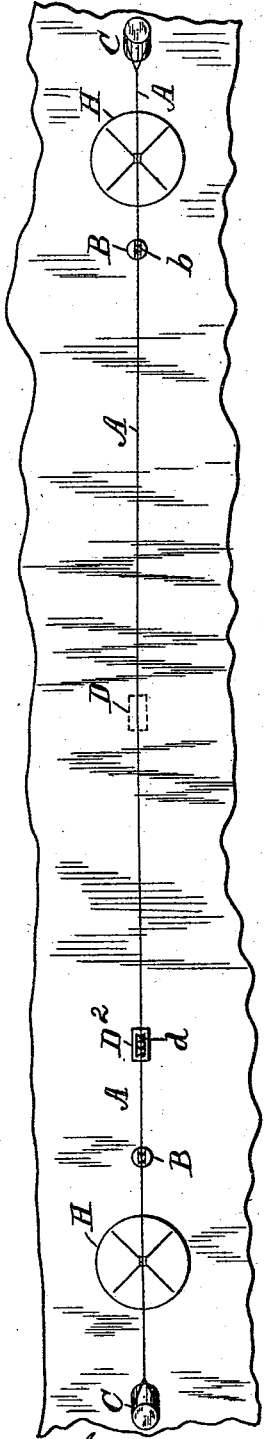

Figure 1 is a side elevation of a cable with a movable carrier; and Fig. 2 is a plan of the same, the cable being represented in Fig. 1 in three positions, as will be explained hereinafter.

A designates the cable, B the towers or bearings between which it is suspended, and C the fixed anchors at ends of cable.

D D' D² designate a movable load, such as the electric carrier described in my prior application, or any load transported on the cable between the bearings B, being supported thereon by wheels $d$.

Rollers $b$ are shown on the tops of the bearings or towers to reduce the friction of the cable over the bearings, as my invention requires the cable to draw over the tops of the bearings when the load approaches the latter.

Heretofore, where a suspended cable has been unprovided with any tension device, the angle of the cable to the horizontal, where the load depresses it, varies in an increasing degree as the load moves from the middle of the cable toward the bearings, thus increasing the grade up which the load is propelled and necessitating the provision of excessive power to provide for the resistance experienced near the bearings. This is illustrated in Fig. 1, where the dot-and-dash line $e$ represents the angle of the cable when the load D is midway between the bearings B.

The fine-dotted line $e'$ represents the changed angle of the cable, adjacent to the bearings, when the load approaches one of the same, as at D'.

Without any tension device the parts of the cable outside of the bearings (denoted by lines $f$) are drawn straight, and all the slack of the cable is gathered where the load D' is supported, thus making a much more acute angle with the bearing, as at $e'$, than when the load is in the middle of the cable. To move the load toward the bearing, when at D', thus requires a great amount of power, and the object of my invention is to take up the slack of the cable under such conditions, and thus preserve the original angle. Substantially the same amount of power is then required to move the load upon any part of the cable in the same direction. This result I effect by attaching suitable weights to the sections of cable between the bearings B and anchors C, as represented by the pans H carrying stones or weights $h$.

As the weight of the load produces the greatest cable tension when in the middle of the cable, the sections having the pans H are lifted at such times, as represented by the dotted lines $f$, but the tension of the cable diminishes rapidly as the load D² approaches the bearings B, and the weights $h$ then fall, drawing the cable downward outside of the bearings B and taking up the slack between the bearings, as indicated by the full line A in the drawings.

It will be observed that the angle of the full line A near the bearing is the same as that of the dot-and-dash line, and the force required to propel the carrier is therefore no greater when near the bearing than when in the middle of the span.

The weights $h$ would be properly proportioned to take up the slack of the cable when most heavily loaded.

The rollers $b$ permit the drawing of the cable over the bearings without chafing.

I am aware that tension devices requiring special ropes attached to the cable have been applied to the cable between the bearings B; but my invention avoids the use of any appliances whatever except the weight applied directly to the cable between the anchorage and the adjacent bearing. Tension-weights applied to the end of a cable or of an auxiliary rope attached thereto to draw the same longitudinally have much less mechanical effect than when applied to draw the cable laterally, and my invention thus enables a smaller weight to be used for producing the same effect.

The weights may be readily applied to many existing cable-transmission plants by making wooden pans F at the site of the anchorages and attaching them to the cable near the same with a quantity of stones sufficient to produce the required tension.

The power required for operating many existing lines may thus be reduced one-half, as it is common to provide twenty-five horse-power for hauling a carrier over the bearings, when only five horse-power is required to move the carrier in the middle of the span.

The weights $h$ may be applied to both the anchorages, as shown in the drawings, or to one only, as may be found necessary in each particular case.

What I claim is—

The combination, with a cable having a movable carrier suspended thereon for transporting a load, and having bearings with fixed anchorages adjacent thereto, of a weight suspended upon the cable between the bearing and anchorage, to take up the slack, and operating to reduce the inclination of the cable as the carrier approaches the bearings, substantially as herein set forth.

In testimony whereof I have hereunto set my hand in the presence of two subscribing witnesses.

WILLIAM F. BROTHERS.

Witnesses:
 THOMAS S. CRANE,
 L. LEE.